UNITED STATES PATENT OFFICE.

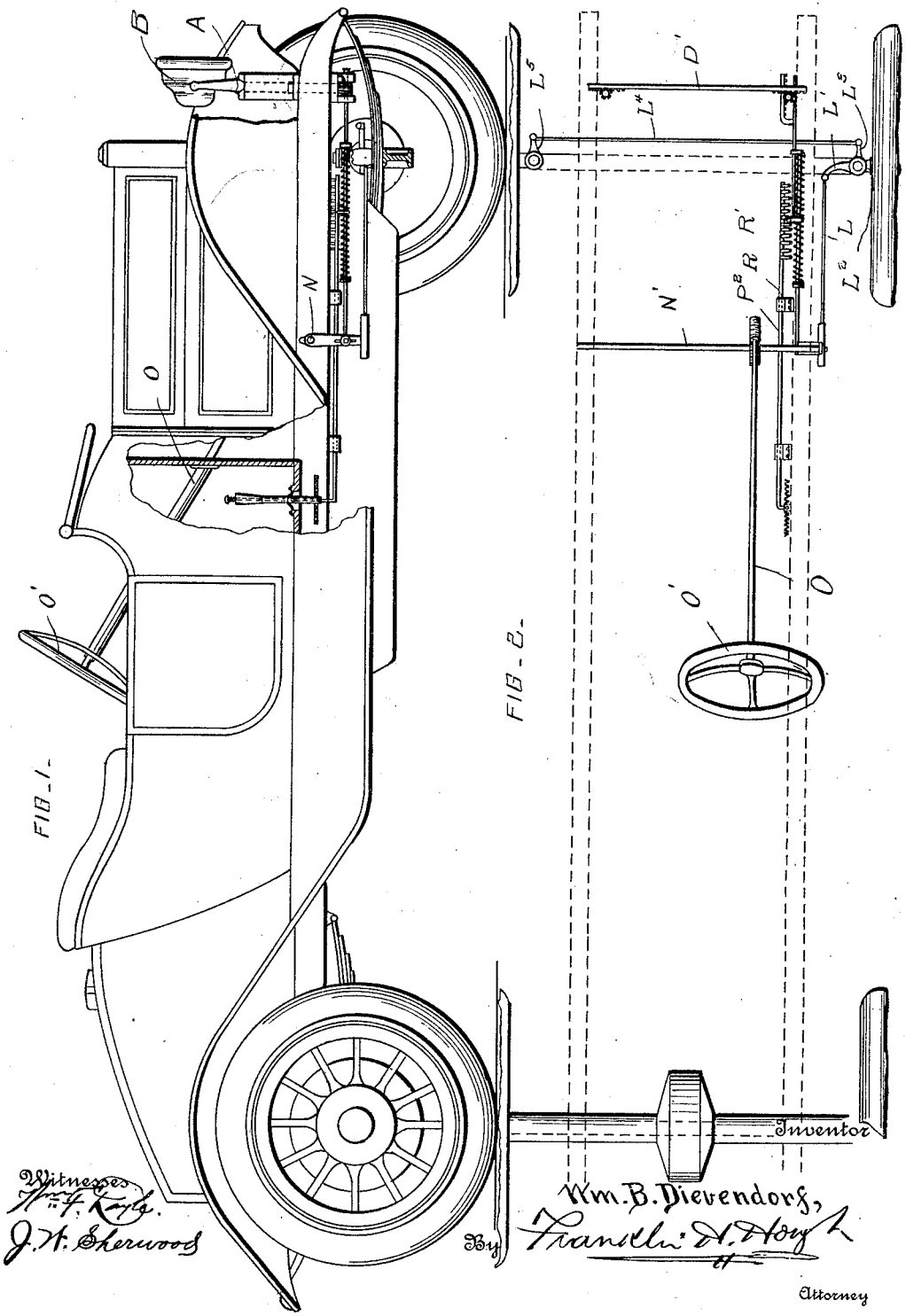

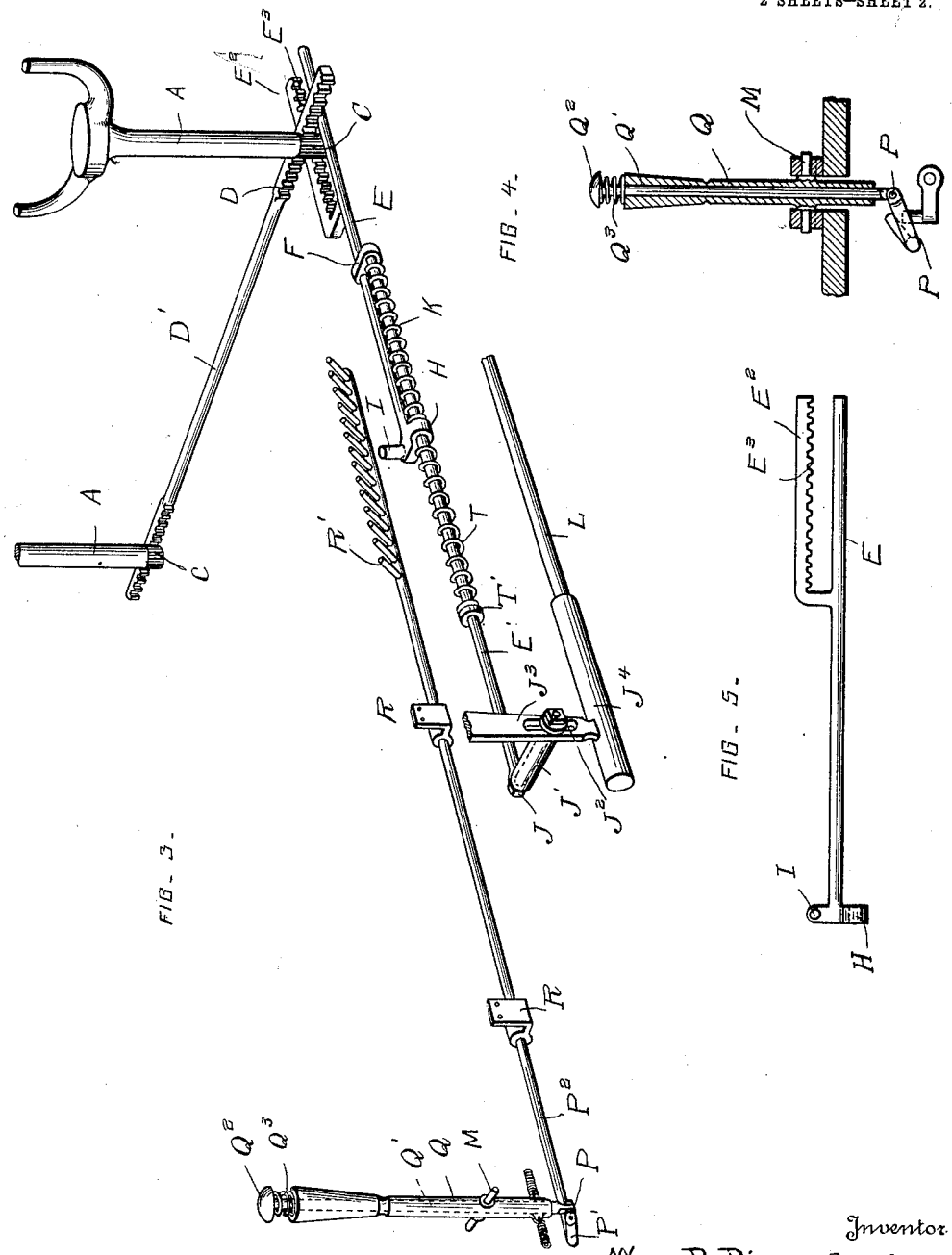

WILLIAM B. DIEVENDORF, OF SPRAKERS, NEW YORK.

DIRIGIBLE LAMP FOR AUTOMOBILES.

1,079,844. Specification of Letters Patent. Patented Nov. 25, 1913.

Application filed July 25, 1913. Serial No. 781,240.

*To all whom it may concern:*

Be it known that I, WILLIAM B. DIEVENDORF, a citizen of the United States, residing at Sprakers, in the county of Montgomery and State of New York, have invented certain new and useful Improvements in Dirigible Lamps for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable, automatically and manually-operated dirigible lights for automobiles and vehicles of various kinds and the object in view is to produce a simple and efficient device of this nature so arranged that the light from the lamps may be automatically thrown upon the tracks to be traversed by the wheels of the vehicle as well as in the provision of lever-actuated mechanism whereby the lights may be turned independent of the steering gear to reflect the light in different positions.

My invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of an automobile partially in section showing the application of my invention. Fig. 2 is a top plan view of the chassis of an automobile with my dirigible light-operating apparatus shown as applied thereto. Fig. 3 is a detail perspective view of the apparatus detached from the vehicle. Fig. 4 is a sectional view through the lever mechanism for operating the light, and Fig. 5 is an enlarged detail view of a portion of the apparatus.

Reference now being had to the details of the drawings by letter, A, A designate the pivotally mounted light-holding bracket members to the arms of which the lights B, one of which is shown in Fig. 1 of the drawings, are pivotally connected. The posts of said bracket members are mounted in suitable bearings upon the frame of the vehicle and each post has circumferential teeth C which are adapted to mesh with the teeth D of the rack bar D′ which is mounted to have a longitudinal movement and affording means whereby the two lamps may be turned in unison.

Two horizontally disposed and longitudinally movable bars E and E′, parallel to each other, are mounted in suitable bearings in the frame of the apparatus. Said rod E, having an integral rack bar E², is provided with teeth E³ which are in mesh with the teeth C of one of said posts A, and a plate F is fastened to the rod E and is apertured for the reception of the rod E and the rod E′ passes through the eye H which is integral with the rod E, the latter also being provided with an upwardly extending lug I. A coiled spring K is mounted upon the rod E′ intermediate said eye H and the plate F and is of sufficient strength to cause the two rods E and E′ to move longitudinally together in opposite directions for the purpose of causing the posts to make partial rotary movements to throw the light upon the tracks of the vehicle when the latter is moving. The rod E′ is pivotally connected to a bolt J which passes through a tubular washer J′ and engages a slot J² formed in the upwardly projecting arm J³ of the shell J⁴. A rod L telescopes within and is secured to the shell J⁴ and has connection with an arm L′ projecting from the stub axle L², said axle also having a second arm L³ which is connected through the medium of the rod L⁴ with a similar arm L⁵ upon the other stub axle of the vehicle, forming the usual connections for the steering gear of automobiles. The arm J³ is fixed to a horizontally disposed rock shaft N of the vehicle and which has connection by the usual worm gear with the steering post O of the automobile to which the wheel O′ is fixed.

Pivotally mounted upon the laterally extending pins M is a hollow post Q which extends through an opening in the floor of the car and Q' designates a longitudinally movable rod mounted within the post Q and has a head Q² intermediate which and the top of the post a coiled spring Q³ is positioned, the purpose of which spring is to hold the rod normally in the position shown in Fig. 4 of the drawings. The lower end of the rod Q is pivotally connected by means of a pin P with a crank arm P' formed at the end of a rock shaft P², a detail perspective view of which is clearly shown in Fig. 3 of the drawings, said shaft P² being mounted in the bearings R fastened to the frame of the car and is provided with series of laterally projecting pins R' spaced apart from one another, which pins R' are adapted to engage the lug I when the shaft is rocked in one direction. A coiled spring T is interposed between the eye H and a collar T' which is fixed to the shaft N and serves as means for returning the rod E to its normal position after having been moved through the medium of the bar P² and the pins R' projecting therefrom.

The operation of my invention will be readily understood and is as follows: When it is desired to allow the lights to be operated automatically through the connections shown with the steering gear, when the wheels upon which the stub shafts are mounted turn in unison with each other, the two rods E' and E will move together accordingly, the strength of the spring R being such as to cause the rack bar E² to move back and forth with its teeth intermeshing with the teeth upon the post A, causing the two lamp carrying bracket members to rotate together which will throw the rays of light from the lamps upon the track to be traversed by the wheels. Should it be desired to cause the lamps to be turned independently of the steering mechanism, it may be done by the operator first pressing down upon the head Q² of the rod Q', which movement will cause the shaft P² to rock and throw the fingers R' down so that one of the same will engage the lug I, after which, by rocking the lever Q upon its pivotal pins, a longitudinal movement may be imparted to the rock shaft P², thus causing the rod E to be moved independent of the rod E'. which will cause the two posts carrying the lights to be thrown in one direction or the other. When the operator releases pressure from the head Q² of the rod Q', the spring Q³ will return the latter to its normal position, causing the shaft P² to rock back to its normal position shown in Fig. 3 and out of engagement with the lug I.

By the provision of an apparatus as shown and described, it will be noted that a dirigible lamp is provided which may be automatically operated in connection with the steering mechanism to cause the rays of lights from the lamps to shine upon the tracks to be traversed by the automobile or through the mechanism illustrated manually-operated means is provided whereby the lights may be thrown to one side or the other of the track independent of the steering mechanism.

What I claim to be new is:—

1. In combination with the steering mechanism of a vehicle, a combined automatic and manually-operated mechanism for dirigible lights comprising rotatable lamp carrying posts with teeth upon the circumference thereof, a rack bar having teeth meshing with the teeth upon said posts, longitudinally movable parallel rods and bearings in which the same are mounted, coiled springs intermediate said bearings, one of said rods having a rack bar adapted to mesh with the teeth upon one of said posts, connections between one of said rods and the steering mechanism of the vehicle for causing the rods to move in unison with the steering wheels of the vehicle, and mechanism for actuating one of said rods independent of the other to cause said lamp carrying posts to be rotated independent of the steering mechanism, as set forth.

2. In combination with the steering mechanism of a vehicle, a combined automatic and manually-operated mechanism for dirigible lights comprising rotatable lamp carrying posts with teeth upon the circumference thereof, a rack bar having teeth meshing with the teeth upon said posts, longitudinally movable parallel rods and bearings in which the same are mounted, coiled springs intermediate said bearings, one of said rods having a rack bar adapted to mesh with the teeth upon one of said posts, connections between one of said rods and the steering mechanism of the vehicle for causing the rods to move in unison, a lug projecting from one of said rods, a longitudinally movable rock shaft with projections thereon adapted to engage said lug, and means for imparting a longitudinal movement to said shaft for causing one of said rods to move independent of the other, as set forth.

3. In combination with the steering mechanism of a vehicle, a combined automatic and manually-operated mechanism for dirigible lights comprising rotatable lamp carrying posts with teeth upon the circumference thereof, a rock bar having teeth meshing with the teeth upon said posts, longitudinally movable parallel rods and bearings in which the same are mounted, coiled springs intermediate said bearings, one of said rods having a rack bar adapted to mesh with the teeth upon one of said posts, connections between one of said rods and the steering mechanism of the vehicle for causing the rods to move in unison, a lug projecting from one of said rods, a longitudinally movable rock shaft with projections thereon adapted to engage said lug, and a depressible rod having pivotal connection with a crank upon said rock shaft, as set forth.

In testimony whereof I hereunto affix my signature in presence of two witnesses.

WILLIAM B. DIEVENDORF.

Witnesses:
ALLEN J. DIEVENDORF,
PERLIA ENGLAND.

Copies of this patent may be obtained for five cents each, by addressing the "Commissioner of Patents, Washington, D. C."